US006963358B2

(12) United States Patent
Cohen et al.

(10) Patent No.: US 6,963,358 B2
(45) Date of Patent: Nov. 8, 2005

(54) WIRELESS DIGITAL CAMERA ADAPTER AND SYSTEMS AND METHODS RELATED THERETO AND FOR USE WITH SUCH AN ADAPTER

(75) Inventors: Scott Cohen, Charlestown, MA (US); Jonathan Nierenburg, Cheshire, CT (US); Justin C. S. Noel, Tewksbury, MA (US); Eric N. Clark, Exeter, NH (US); Anthony Gabrielson, Melrose, MA (US)

(73) Assignee: DropFire, Inc., Charlestown, MA (US)

( * ) Notice: Subject to any disclaimer, the term of this patent is extended or adjusted under 35 U.S.C. 154(b) by 626 days.

(21) Appl. No.: 10/007,629

(22) Filed: Nov. 13, 2001

(65) Prior Publication Data
US 2002/0108118 A1 Aug. 8, 2002

Related U.S. Application Data
(60) Provisional application No. 60/247,190, filed on Nov. 10, 2000.

(51) Int. Cl.[7] .................. H04N 5/225; H04N 5/232
(52) U.S. Cl. .................. 348/207.1; 348/211.2
(58) Field of Search .......... 348/207.1, 211.2, 348/211.99, 211.1, 552, 211.3, 211.14, 14.12; 455/556.1, 557, 566; 725/105; 709/200, 203, 202, 217, 219, 228, 232, 245

(56) References Cited

U.S. PATENT DOCUMENTS

| | | | |
|---|---|---|---|
| 4,511,252 A | 4/1985 | Di Matteo et al. | 356/375 |
| 4,630,912 A | 12/1986 | Whiteside | 354/88 |
| H1616 H | 12/1996 | Wolfe | 348/88 |
| 5,606,365 A | 2/1997 | Maurinus et al. | 348/222 |
| 5,737,491 A | 4/1998 | Allen et al. | 395/2 |
| 5,768,633 A | 6/1998 | Allen et al. | 396/2 |
| 5,806,005 A | 9/1998 | Hull et al. | 455/566 |
| 5,815,205 A | 9/1998 | Hashimoto et al. | 348/373 |
| D405,457 S | 2/1999 | Kawashima | D16/208 |
| 5,893,037 A | 4/1999 | Reele et al. | 455/556 |
| 5,917,542 A | 6/1999 | Moghadam et al. | 348/207 |
| 6,038,295 A | 3/2000 | Mattes | 379/93.25 |
| 6,092,078 A | 7/2000 | Adolfsson | 707/102 |
| 6,104,430 A | 8/2000 | Fukuoka | 348/232 |
| 6,122,526 A | 9/2000 | Parulski et al. | 455/556 |

FOREIGN PATENT DOCUMENTS

| | | | | |
|---|---|---|---|---|
| EP | 0 205 996 B1 | 3/1992 | | G03B/17/52 |
| EP | 0 837 323 A3 | 12/1998 | | G01N/21/89 |
| EP | 0905679 | 3/1999 | | |
| EP | 0920179 | 6/1999 | | |
| EP | 0961451 | 12/1999 | | |
| EP | 0991260 | 4/2000 | | |
| JP | 10336574 | 12/1998 | | |
| WO | WO 98/41020 | 9/1998 | | H04N/7/10 |
| WO | WO 99/63443 | 12/1999 | | G06F/12/14 |
| WO | WO 00/07341 | 2/2000 | | H04L/29/06 |
| WO | WO 00/28494 | 5/2000 | | G07F/19/00 |
| WO | WO 0030338 | 5/2000 | | |
| WO | WO 0031966 | 6/2000 | | |

Primary Examiner—Aung Moe
(74) Attorney, Agent, or Firm—William J. Daley, Jr.; Edwards & Angell, LLP

(57) ABSTRACT

Featured is a digital data storage and transmitting (DDST) device, particularly suited for use with a digital camera, digital camcorder or other image/video capturing device, being configured and arranged so as to cable of downloading the digitized data representative of the images/pictures taken with the digital camera and to store this information in the DDST device. The DDST device also is configured and arranged so the DDST device can upload or transmit the downloaded picture information to a remote server using any of a number of communication protocols or techniques known to those skilled in that art including wireless or cellphone technologies. Also featured are systems embodying such a DDST device and methods related thereto.

17 Claims, 12 Drawing Sheets

WIRELESS DIGITAL CAMERA ADAPTER AND SYSTEMS AND METHODS RELATED THERETO AND FOR USE WITH SUCH AN ADAPTER

This application claims the benefit of U.S. Provisional Application Ser. No. 60/247,190 filed Nov. 10, 2000, the teachings of which are incorporated herein by reference.

FIELD OF INVENTION

The present invention relates to a device for use with a digital camera, digital camcorder or other image/video capture device that downloads and/or stores digitized images from the camera, camcorder, etc. and which also transmits the downloaded images to a remote site using any of a number of communications protocols or techniques, more particularly RF communications. Also featured are systems using such a device and methods related thereto.

BACKGROUND OF THE INVENTION

There is shown in FIGS. 1A–C various views of an exemplary illustrative digital camera 10 that shows or illustrates some features typically provided with such cameras. It should be recognized the location and disposition of such features or elements of the digital camera 10 are illustrative as is well known to those skilled in the art. Such a digital camera 10 typically includes the optics and circuitry (not shown) as is known in the art for receiving an optical image, digitizing the image and storing the digitized image therein.

The illustrated digital camera 10 includes a lens 12 or lens assembly and a lens cover 14 that is configured and arranged so as to be moveably disposed between a closed and open position. In the closed position the lens cover 14 is located so as to cover the lens 12 and in the open position the lens cover is moved laterally so the lens is exposed for picture taking. The lens 12 and lens cover 14 are any of a number of devices and mechanisms known to those skilled in the art and thus are not further described herein.

The illustrative digital camera 10 also includes a button 16 that is provided to function as the shutter release whereby a picture is taken. As with SLR types of cameras, a user typically composes the scene or picture in the optical view finder 18 and then fully depresses the shutter release button 16 so as to "take" the picture. Alternatively, the scene or picture can be composed in the LCD monitor or display 20. In addition to displaying the scene or picture being composed, the LCD display 20 also receives signals so as to display any of a number of icons or information such as date and time. The camera 10 also can include a switch 24 so the LCD display 20 is switchable between for example an ON, OFF or PLAY condition. The digital camera 10 also typically includes another LCD, a control panel 22 that displays any of a number of icons or information generally involving the use of the camera, for example, the resolution, number of pictures, battery status and the like.

As is known to those skilled in the art, the light comprising the scene or picture to be taken is manipulated so that it is incident upon a electronic image sensor (e.g., a CCD solid state imaging device). The electronic image sensor outputs a multiplicity of signals that correspond to the image being sensed. These output signals are digitized and stored in a memory internal to the camera and thus comprise the picture or scene taken by user. The numbers of signals that are outputted for a given picture are dependent upon a number of factors such as the number of pixels comprising the image sensor and the desired picture resolution.

Now referring also to FIG. 2. after pictures are taken using the digital camera 10, the user plugs one end of an interconnecting computer cable 30 into a terminal or port 32 in the camera and the other end in a port, terminal or other connection of the computer 40. With some cameras, the lens cover 14 also is slid back or located in the closed position when downloading images. A software application program (s) is/are installed on the computer 40 for execution on the processor thereof. The software causes the stored digital data to be downloaded from the camera 10 to the computer 40 and stored in the computer storage medium (e.g., hard drive). The software also allows the images to be manipulated further (e.g., cropping), if desired, and printed out. After the digitized image data is downloaded, the data is expunged from the built-in memory of the camera 10 so additional pictures can be taken.

When downloading digitized data the user also can interconnect the cable of an AC/DC power adapter (not shown) to the power terminal 34 of the camera 10 so that the camera is not relying on the limited power being provided by the batteries that typically power such cameras. The AC/DC adapter also can be used, when possible, during picture taking to extend the life of the battery power supply.

Because of the limited storage capacity for digitized images in digital cameras, the software comprising the camera 10 also is typically configured and arranged to allow the user to view each image or picture taken and to delete it from the memory when the image is not acceptable. In such cases the user would view the image using the LCD monitor or display 20 and if the image is not acceptable, the shutter release button 16 was adapted to delete the digitized information when the button is fully depressed. The digital camera 10 typically includes other switches, buttons or mechanism for accomplishing such reconfiguring of the camera to perform these and other functions.

As indicated the digital camera 10 typically has a limited storage capacity (e.g., 8 Mb). The built in memory of a typically digital camera is sized so as to be capable to store a predetermined number of pictures of the highest picture quality typically on the same order as the number of pictures that can be taken by a normally sized roll of 35 mm film (for example 20–30 pictures). In the case of early versions of digital cameras, once the built-in memory was filled, the user could not take any more pictures. Consequently, the manufactures of early digital cameras recommended that the user download the pictures taken to a personal computer as soon as possible and that pictures be erased from the camera on a regular basis.

Because of the limitations imposed on the number of pictures with the highest quality resolution that could be taken using a digital camera, various methods, schemes, techniques and devices have been developed in an attempt to overcome or compensate for this limitation. One technique that has found some acceptance is the use of a plug-in memory module. In this method a user purchases one or more memory modules of a predetermined storage capacity. The plug-in module is plugged into the camera and pictures are taken. When this module is filled, another is inserted and the process is repeated as and when needed. Thereafter the information stored on the individual memory modules is downloaded to the personal computer 40.

In another technique, the digital camera is configured with a built-in cellular telephone or configured to interface with one so that the digitized image data in the memory of the camera can be transmitted to a personal computer. One or more forms of such a technique art found in U.S. Pat. Nos.

6,122,526; 6,104,430; 6,038,295; 5,917,542 and 5,806,005. Such a technique also is found in U.S. Pat. No. 5,893,037 which describes a combined electronic silver-halide image capture system. These systems are premised on the capability of the communications device being able to download the digitized image data with enough frequency that the limited storage capacity of the image device capturing the image would not be a problem. Such systems are necessarily limited by the extent of signal coverage provided by the transmission or cellular telephone system as well as the ability of such systems to handle such data transmissions. Such techniques also necessarily increase the cost and size of digital camera and/or the need for specialized components for such cameras.

In addition to still digital cameras, the art has been advancing to include digital camcorders, that also have still picture taking capability. These digital camcorders like their still picture brethren have limited storage capacity and thus are subject to similar limitations as those described above for the still picture digital cameras.

Thus, there continues to be a need to improve upon the capability of storing digitized image data as well as the capability for remotely transmitting such data while at the same time not increasing the complexity and cost of the device (e.g., digital camera) capturing the images. It thus would be desirable to provide a device that allows a user to easily download digitized image data from the camera to the device including systems and methods related thereto. It would be particularly desirable to provide such a device that would allow the digitized image data to be transmitted from the device to a remote location, more specifically transmitted without requiring the actions of the user. It also would be desirable to provide such a device that would be adaptable to download digitized image data using any of a number of known communication protocols or techniques. Such a digitized data downloading and transmitting device preferably would be simple in construction and would not require highly skilled users to utilize the device.

SUMMARY OF THE INVENTION

The present invention features a digital data storage and transmitting (DDST) device, particularly suited for use with a digital camera, digital camcorder or other image/video capturing device, being configured and arranged so as to be capable of downloading the digitized data representative of the images/pictures taken with the digital camera and to store this information in the DDST device. The DDST device also is configured and arranged so the DDST device can transmit the downloaded picture information to a remote server using any of a number of communication protocols or techniques known to those skilled in that art. Also featured are systems embodying such a DDST device and methods related thereto.

The DDST device includes I/O mechanisms used for communicating the digital image data to be downloaded to the storage medium of the DDST device. In one embodiment, the DDST device includes one or more ports or terminals to removably receive therein one end of an electrical or optical cable, the other end of which is received in the digital camera I/O port. In another embodiment, the I/O mechanisms embodies wireless technology, whereby the digital data is communicated wirelessly from the camera to the DDST device.

In further embodiments, the DDST device includes a non-volatile storage medium whereby digital image data is stored and remains stored even if the power to the DDST device is removed or otherwise interrupted. Such nonvolatile storage mediums include flash or spindle types of memory including for example NVRAM as well as hard drives. More particularly, the storage medium has a storage capacity far in excess of that provided in conventional cameras or memory modules. In specific embodiments the storage medium embodying flash or spindle memory has a capacity of about 500 Mb or larger, in the range of from about 500 to about 1000 Mb, or 1000 Mb or larger.

The DDST device also is configured and arranged so as to include a transmission mechanism so the downloaded digital image data is communicated to a remote server using any one or a combination of communication protocols, techniques and technologies. In one embodiment, the DDST device includes a wireless RF transmission means embodying known RF wireless communications techniques, technology and RF devices including satellite systems to establish a wireless communications link between the DDST device and a remote wireless reception site. It also is within the scope of the present invention to adapt the wireless communication means to utilize developing wireless technologies to establish such a communications link. It also is within the scope of the present invention for the wireless communications means to comprise any of a number of devices, modems or circuitry known to those skilled in the art. The communications link between the reception site and a remote server can further include any of a number of network infrastructures known to those skilled in the art including those embodying wireless technologies.

Once the communications link is established the digitized data from the digital camera is transmitted to the remote server or storage site via the communications link. The DDST device also includes circuitry and/or software driven devices (e.g., processor) so as to convert the digitized data from the digital camera into the appropriate format for transmission over the established communications link. Such circuitry and/or software driven devices also are configurable so the information be transmitted includes data or information so as to allow the transmitted information to be received and stored at the remote site for later retrieval by the picture taker/user or other authorized party.

The picture/image information transmitted to the remote server/site is stored at the site in an appropriate storage medium such as a hard disk, optical disk, magneto-optical disk so the user can retrieve the information at a later time. In a specific embodiment, the user contacts the remote storage site using the internet and accesses the stored data information via an established web site. The user can further download the information directly to the user's computer, print the information or take some other action (e.g., cropping, enlarging, etc.). The remote web site also can be configured to allow authorized individuals other than the picture taker/user to gain access to and/or retrieve the stored information.

Also featured are systems and methods related thereto.

Other aspects and embodiments of the invention are discussed below.

BRIEF DESCRIPTION OF THE DRAWING

For a fuller understanding of the nature and desired objects of the present invention, reference is made to the following detailed description taken in conjunction with the accompanying drawing figures wherein like reference character denote corresponding parts throughout the several views and wherein.

DESCRIPTION OF THE PREFERRED EMBODIMENT

Figure 3A:
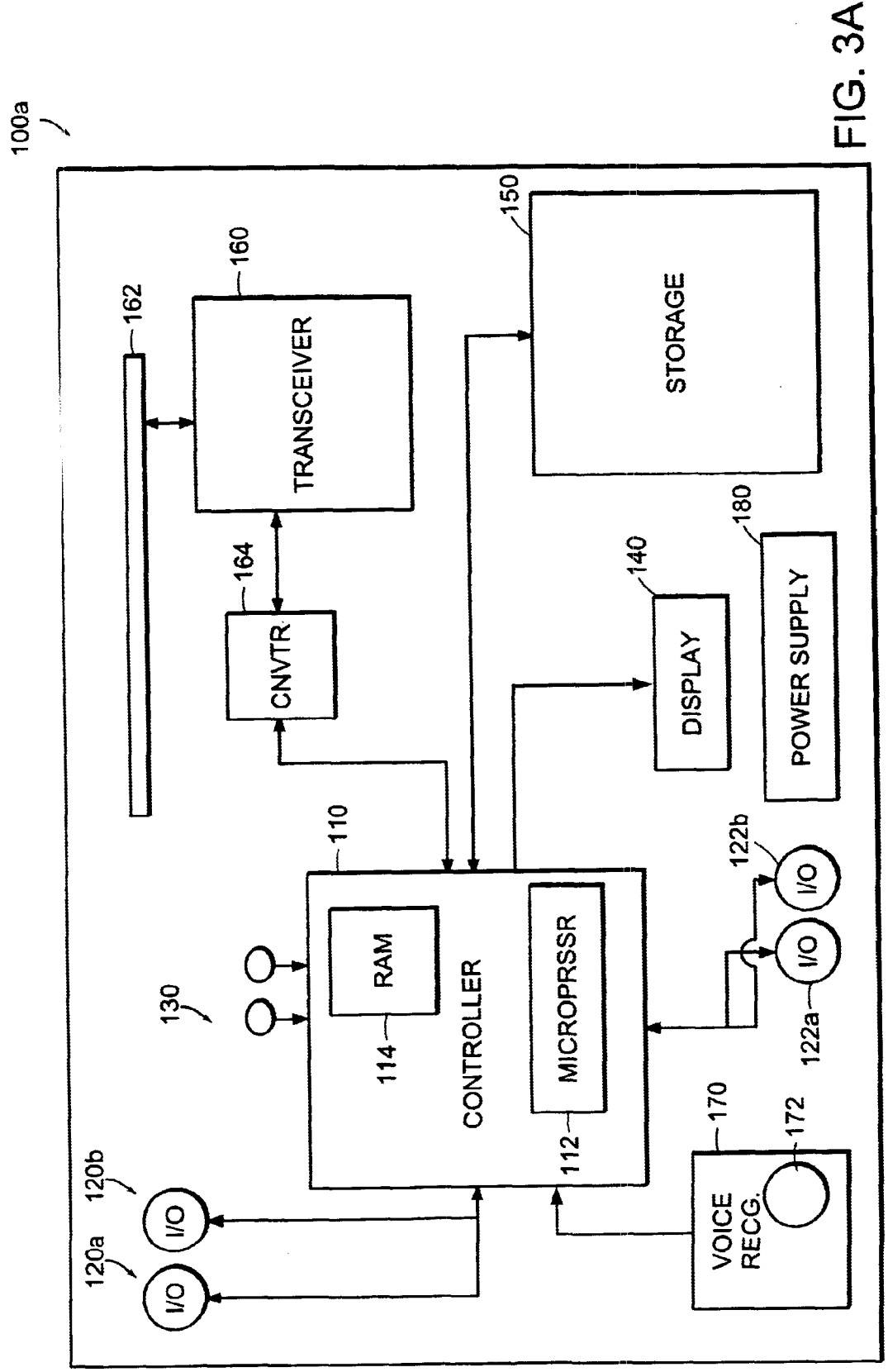
FIG. 3A is a block diagram of a digitized data storage and transmitting device according to one aspect of the present invention.
Figure 3B:
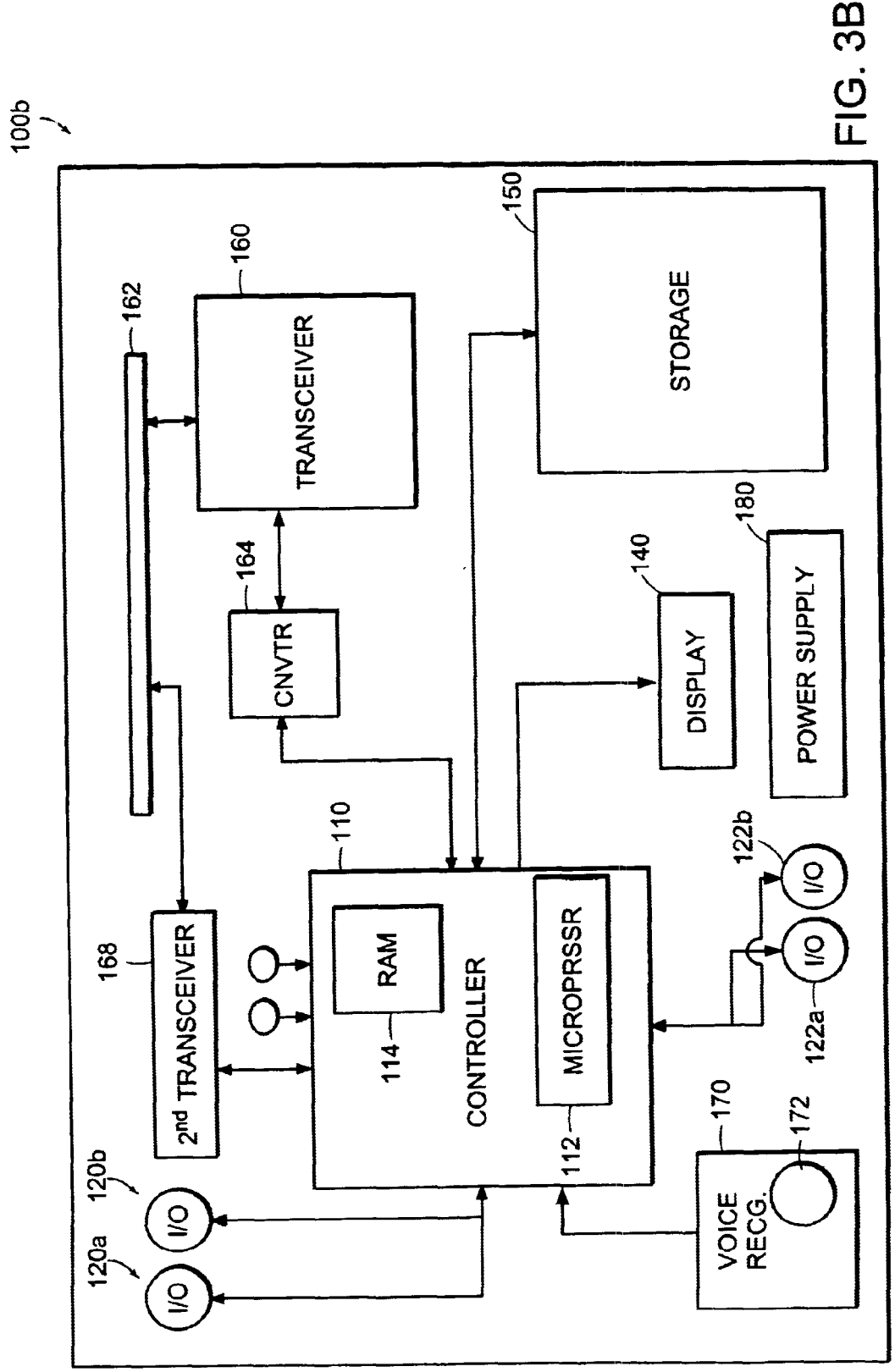
FIG. 3B is a block diagram of a digitized data storage and transmitting device according to another aspect of the present invention.
Figure 3C:
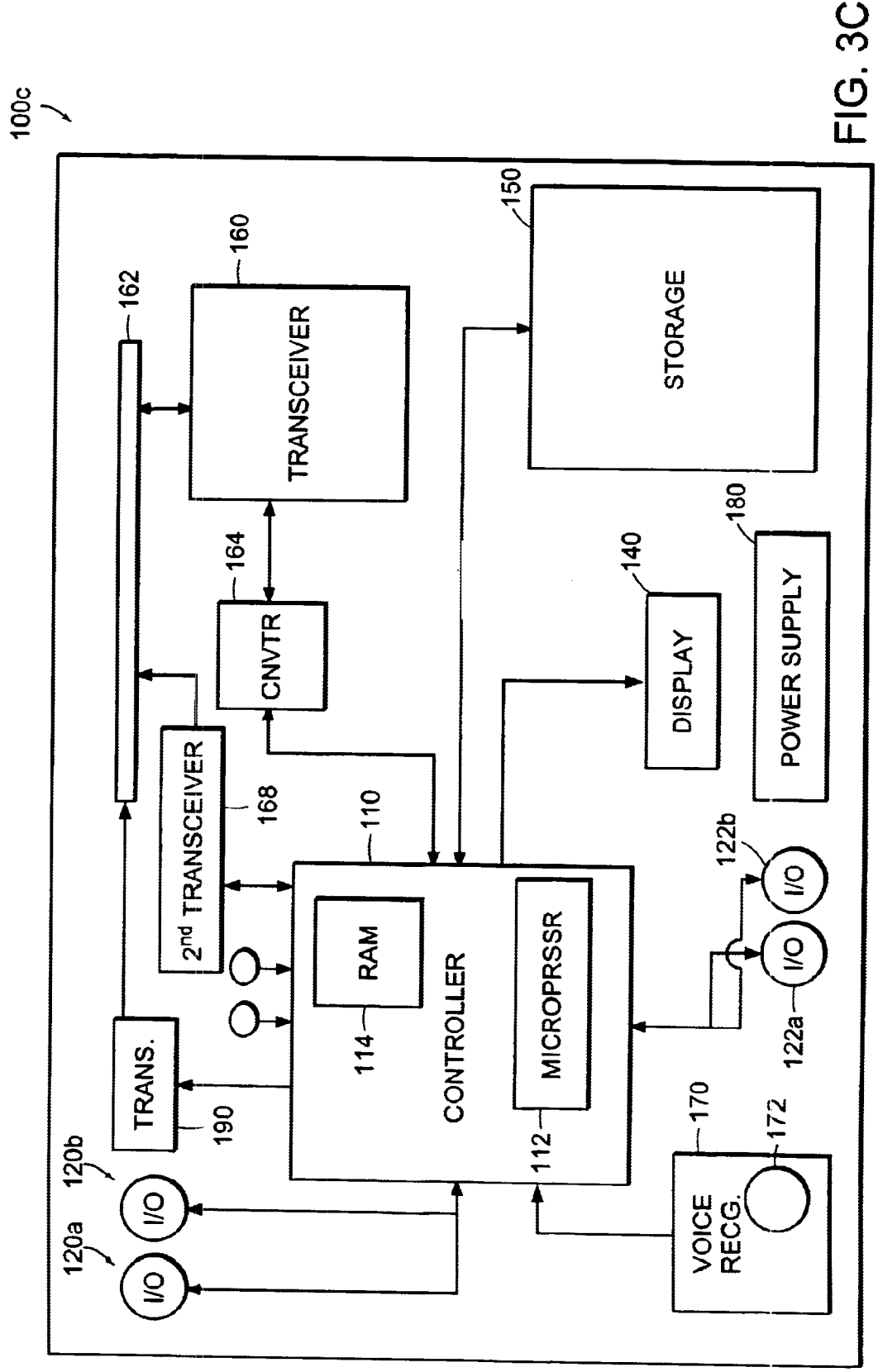
FIG. 3C is a block diagram of a digitized data storage and transmitting device according to yet another aspect of the present invention.

Referring now to the various drawing figures, wherein like reference characters refer to like parts, there is shown in FIGS. 3A–C various aspects and embodiments of a digitized data storage and transmitting device 100 according to the present invention. In the discussion hereinafter, reference numeral 100 is used when making general reference to a digitized data storage and transmitting device according to any aspect or embodiment of the present invention. However, an alphanumeric character and/or other character is added when referring to a specific aspect or embodiment thereof.

There is shown in FIG. 3A, a digitized data storage and transmitting device (DDST device) 100a according to one aspect of the present invention. Such a DDST device 100a includes a controller 110 that controls the overall operation of the DDST device including the acquisition of digitized image data from a digital camera 10, the storage of this acquired digital image data and the transmission of such data to a remote location. In more particular embodiments, the controller 110 includes a microprocessor 112, random-access memory (RAM) 114, and one or more software applications or programs for execution on the microprocessor that otherwise carries out the control, data acquisition and data transmission functions of the device.

The microprocessor 112 is any of a number of general purpose microprocessors such as those manufactured by Intel, AMD and Transmatter. More particularly the microprocessor 112 also is characterized as being a high speed, low power, low heat type of general purpose microprocessor. In an exemplary embodiment the microprocessor 112 is a StrongARM 1100/1110 as manufactured by Intel. The RAM 114 is any of a number of volatile type of memories known to those skilled in the art appropriate for the microprocessor 112 it is to be used with.

The DDST device 100a also includes one or more I/O ports 120a,b as are known to those skilled in the art that are operably connected to the controller 110. There are a number of techniques and/or standards being utilized for the transmission of digitized image data from digital cameras including digital camcorders. One I/O technique is commonly referred to as the universal serial bus (USB) more particularly as USB 1.0, 2.0 and 2.1, another involves the use of a serial port and yet another embodies IEEE standard 1394, commonly referred to as Firewire. In the illustrated embodiment, the DDST device 110a includes two such I/O ports 120a,b, more particularly an I/O port 120 configured for one I/O technique (e.g., USB) and the other being configured for another technique (e.g., IEEE-1394).

Figure 1A:
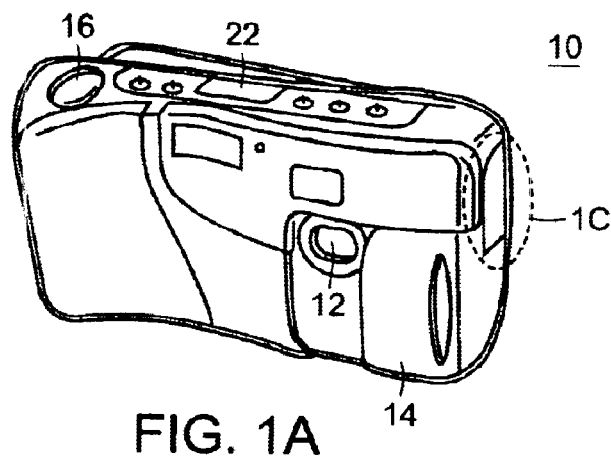
FIG. 1A is a front perspective view of an exemplary illustrative conventional digital camera.
Figure 1B:
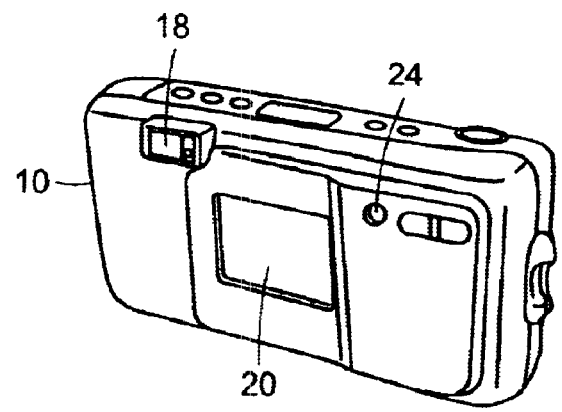
FIG. 1B is a back perspective view of the digital camera of FIG. 1A.
Figure 1C:
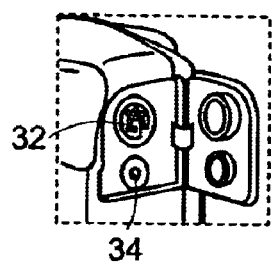
FIG. 1C is a perspective view of a portion of the side of the digital camera of FIG. 1A with a side panel open to reveal hidden ports/terminals.
Figure 2:
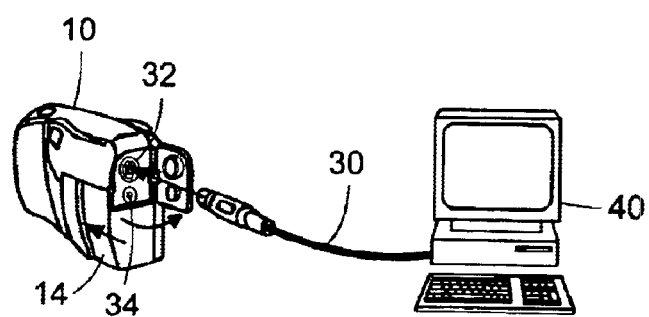
FIG. 2 is a perspective view of the digital camera of FIG. 1A interconnected to a personal computer (PC) for downloading image data.

As shown in FIG. 2, the digital camera manufacture typically provides an interconnecting cable 30 one end of which is appropriately terminated so that it operably engages the port or terminal 32 provided in the camera 10 (FIG. 1C). The other end of the cable 30 also is appropriately terminated for the type of I/O connection technique being utilized for downloading the digitized image data. For example, the other end is terminated for use with an USB or Firewire type of connector detail.

In addition to the I/O ports 120a,b for the downloading of data, the DDST device 100a also includes one or more I/O ports 122a,b that are operably connected to the microprocessor 110 and which are configured and arranged for the transfer of the digitized image data from the DDST device to a server or personal computer using any of a number of non-wireless techniques known to those skilled in the art including any of a number of network infrastructures known to those skilled in the art such as Ethernet, token ring, FDDI, ATM, Sonet, X.25 and Broadband. In particular embodiments, one of the I/O ports 122a is configured and arranged so the port is interconnected directly with the PC using an interconnecting cable and the other I/O port 122b is configured and arranged so as to be connected to a network infrastructure.

As discussed hereinafter, the controller 110 includes software applications or programs for execution on the microprocessor 112 to control the reception of digitized image data from the digital camera 10 via one of the inputting I/O ports 120a,b and to control the transmission of the digitized image data stored in the DDST device 100a from the outputting I/O ports 122a,b. Such control includes any conversion of the digitized data being received so that it can be stored in the DDTS device 100a or conversion of the data being transmitted so it is in an appropriate form for such transmission from the outputting I/O ports 122*a,b*.

In a more particular embodiment, the DDST device 100*a* further includes one or more switches 130 that are operably connected to the controller so as to provide manual control over one or more processes or functions of the DDST device. For example an ON-OFF type of switch can be provided to selectively turn the DDST device 110*a* on or off. Other switches could be provided so as to cause the downloading of digitized data as well as the transmission of any downloaded data.

In an alternative embodiment, switches 130 are provided that work in conjunction with a software application or program being executed on the microprocessor 112 such that one switch causes a cursor to move between a plurality of icons shown on the LCD display 140 and another switch causes the selection/de-selection of the highlighted icon. The software application causes the icons to be displayed and controls the movement between each icon and the selection/de-selection process. The LCD display 140 is any of a number of LCD displays known to those skilled in the art that is appropriate for the type of information to be displayed. For example, the display can be a black/white/gray-scale type of display or it can display colors. The LCD display 140 also can be used much like the LCD monitor 20 of the digital camera to view individual images being stored in the DDST device 100*a*.

The DDST device 100*a* also includes a data storage medium 150 to which the digitized image data is downloaded to and stored therein. The data storage medium 150 is any of a number of mediums known to those skilled in the art where data remains stored in the medium after power is withdrawn and where data can be removed or erased there from without requiring the replacement of the medium. Additionally, the storage medium is of the type that allows large amounts of digitized data to be stored therein as compared to the limited capacity memory of conventional digital cameras or digital camcorders (e.g., 8 MB).

In one embodiment of the present invention, the storage medium 150 comprises non-volatile memory such as flash memory, nonvolatile random access memory (NVRAM) or spindle non-volatile memory as is known to those skilled in the art. In an illustrative embodiment, the storage capacity of the storage medium 150 is about 500 to 1,000 Mb (1 Gb), when the storage medium is comprised of flash or spindle memory. This far exceeds the capacity of the presently available memory modules. It should be recognized that the foregoing shall not constitute a limitation as the DDST device 100*a* can be configured and arranged to have a capacity in excess of 1,000 Mb or less than 500 Mb.

In another embodiment of the present invention, the storage medium 150 comprises a hard drive as is known to those skilled in the art such as those used for notebook types of computers. Such hard drives provide a mechanism for storing even larger amounts of digitized image data, for example 2 Gb, 10 Gb or 20 Gb of data, but the larger storage capacity is offset by the additional power requirements for hard drives.

As to the transmission of digitized data, the DDST device 100*a* includes a transceiver 160, an antenna 162 and a signal converter 164. The antenna 162 is any of a number of types and/or shapes of antennas (e.g., loop type) that is appropriate for the intended use and the type of transceiver. The transceiver 160 is any of a number of devices known to those skilled in the art for wireless transmission including wireless network transmission systems or techniques and those embodied in cellular telephone technology. An exemplary wireless network technique includes those systems embodying a transceiver or transmitter complying with IEEE-802.11 sometimes referred to as Bluetooth chip. Some digital signal transmission techniques within the realm of second and third generation of wireless technologies include CDMA, GSM, TDMA and 1XRTT. In each case, the transceiver 160 is configured and arranged so as to establish a communications link between the DDST device 100*a* and a receiver or transceiver 804 (FIG. 6A) remote from the location of the DDST device. For example, with a DDST device 100*a* having a IEEE-802.11b compliant transceiver, the corresponding remotely located transceiver/receiver would be located within about 100 meters or so of the location of the DDST device and operating at a frequency of about 2.4 GHz.

The converter 164 is provided for configuring the stored digitized data, into the appropriate form for transmission and includes a general purpose microprocessor, RAM and one or more software applications or programs for carrying out the conversion. In addition to the conversion functionalities, the converter 164 also can include encryption functionalities, whereby the digitized data is encrypted using any of a number of encryption techniques known to those skilled in the art. It should be recognized that it is within the scope of the present invention for such software applications or programs to be executed on the controller microprocessor 112 and thus eliminate the need for a separate component.

The DDST device 110*a* includes a power supply 180 selected from any of a number of portable power supplies as is known to those skilled in the art including rechargeable and non-rechargeable types of batteries. In an exemplary illustrative embodiment, the power supply 180 is a rechargeable lithium type of battery. Although not shown in detail in FIG. 3A, the power supply 180 is operably and electrically interconnected to the controller 110, the display 140, the transceiver 160, the converter 164 and the storage device 150 so that power is provided to these various components. Such power also is preferably selectively supplied to at least certain of these identified components so as to extend the life of the power supply 180. For example, the transmitter receives power only when a message is to be transmitted from the DDST device 100*a*.

In a further embodiment, the DDST device 100*a* includes a voice recognition mechanism 170 that includes circuitry/software that allows a user to effect control using verbal messages or instructions. For example, the user can verbally instruct the DDST device 100*a* to download and/or transmit the downloaded digitized image data. In the illustrated embodiment, this is implemented within the DDST device 100*a* as a separate functional component, however, it is within the scope of the present invention to integrate into other circuitry/functional components (e.g., controller 110) comprising the DDST device. In an illustrative embodiment, the voice recognition mechanism 170 further included a device 172, such as microphone, that receives the auditory messages from the user and outputs a signal representative thereof to the voice recognition mechanism.

There is shown in FIG. 3B a DDST device 100*b* according to a second aspect of the present invention. Reference shall be made to the discussion above regarding FIG. 3A for components and functionalities common to both aspects of the present invention. In the second aspect of the present invention, the DDST device 100*b* is configured and arranged with a second transceiver 168 that is operably coupled to the antenna 162 and to the controller 110.

The second transceiver 168 in effect functions as another inputting I/O device for the DDST device 100*b* by which data can be received and sent onto the controller 110 for further processing. In this case, the digital camera, digital camcorder or other image or video capturing device includes a transceiver such as a Bluetooth chip so the digitized image data stored therein can be communicated or downloaded wirelessly from the image capturing device. The second transceiver 168 is any of a number of devices known to those skilled in the art which is compatible with and can receive the signal transmissions emanating from the transceiver or signal transmission device within the image or video capturing device.

Now referring to FIG. 3C, there is shown a DDST device 100c according to a third aspect of the present invention. Reference shall be made to the discussion above regarding FIGS. 3A–B for components and functionalities common to both aspects of the present invention. In the third aspect of the present invention, the DDST device 100c is configured and arranged with a second transceiver 168 and a transmitter 190 that each is operably coupled to the antenna 162 and to the controller.

In the third aspect of the present invention, the digital camera, digital camcorder or other image/video capturing device is typically at a location remote from the DDST device 100c. For example, the image capturing device can be pre-located so as to take pictures of people such as tourists passing through a certain location, people on a ride at an amusement park or tourists riding on buses, boats or other vehicles used for purposes of touring a city or the like.

To actuate the image capturing device so it can take one or more pictures, the DDST device transmitter 190 outputs a signal when the DDST device is in range of the camera, thus triggering or otherwise causing the camera to begin to take one or more pictures. Upon completion of the picture taking sequence by the image capturing device, the camera causes the digitized image data representative of the pictures taken to be downloaded to the DDST device 100c via the second transceiver 168 and stored in the DDST device. It is within the scope of the present invention for the transmitter 190 to be used to trigger more than one image capturing device and to store the digitized image data of all of the pictures taken by the more than one image capturing device on the DDST device that triggered each of the image capturing device.

Figure 4:
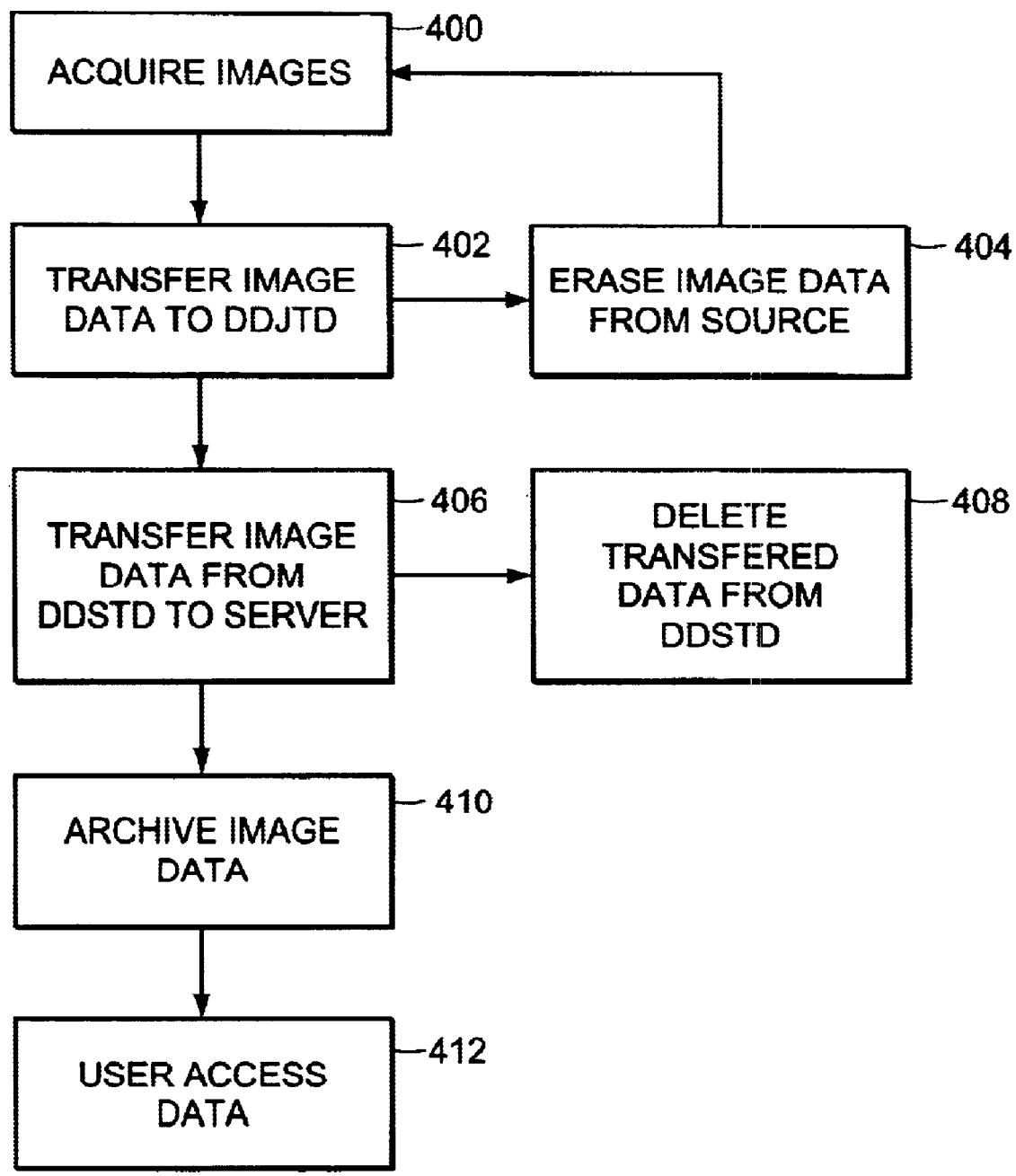
FIG. 4 is a high level flow diagram generally illustrating the overall process of capturing images and through the later accessing of the image data.

There is shown in FIG. 4 a high level flow diagram generally illustrating the overall process of capturing images and through the later accessing of the image data by the user. Reference shall be made to FIGS. 3A–C for any details or structure of the DDST device 100. Initially, the user acquires the images using the image capture device such as a digital camera 10 (FIGS. 1–2) or digital camcorder, STEP 400. As part of this acquiring of images, each of the signals making up an image is digitized and the digitized data representative of the captured image is stored in a memory of that image capturing device.

Figure 5A:
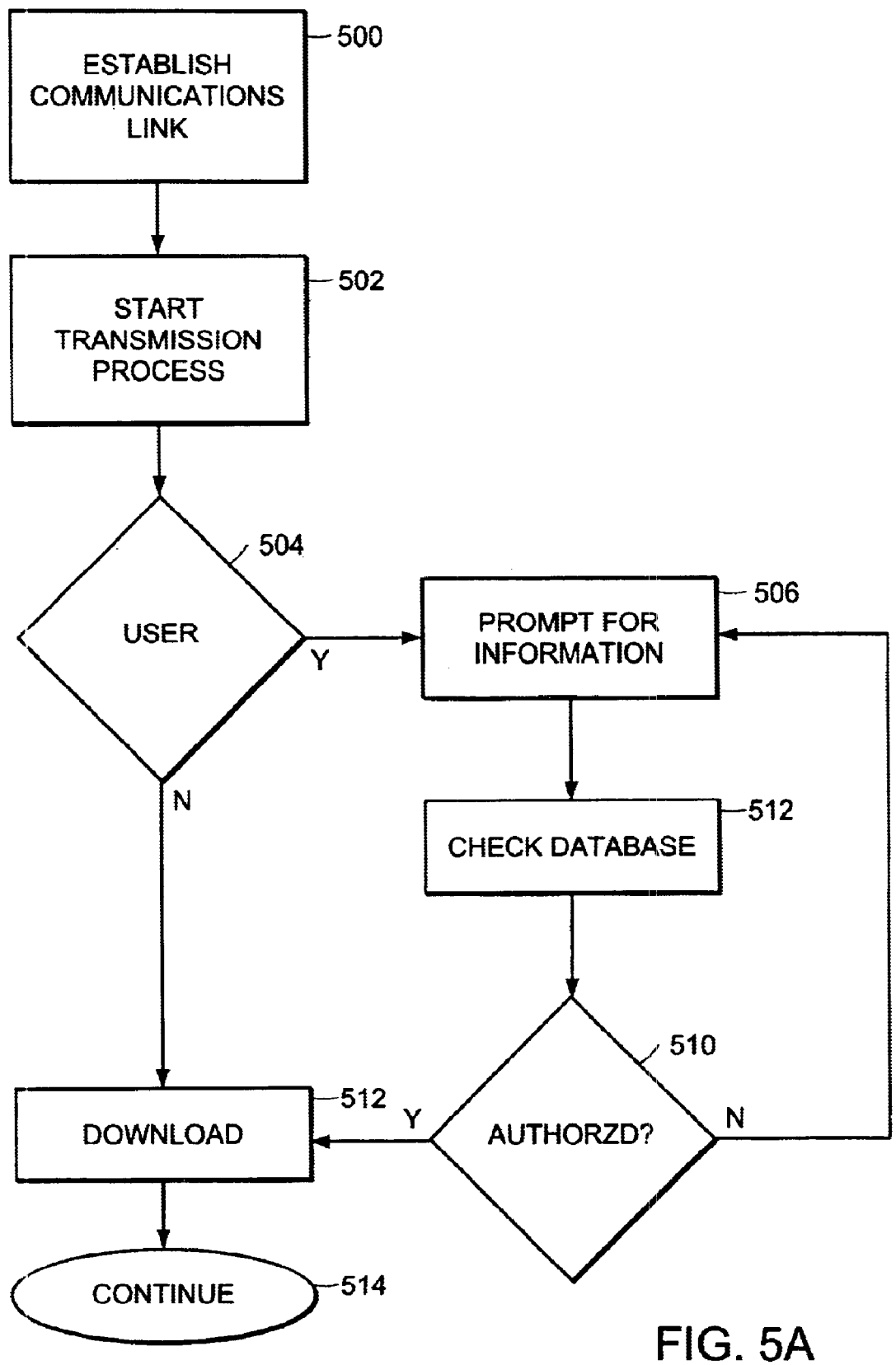
FIG. 5A is a flow diagram of one embodiment of the process for downloading digitized image data from the camera to the digitized data storage and transmitting device.

At some time following acquiring one or more images, the user transfers the digitized image data from the image capture device to the DDST device 100, STEP 402. This transfer or downloading process is more particularly described below in connection with FIG. 5A. After it is determined that the digitized image data is successfully downloaded or transferred, the image capturing device is provided with a signal or other message that causes the digitized image data to be erased from the device memory, STEP 404. Thereafter, the user acquires additional images, STEP 400 and repeats the above process.

After transferring image data to the DDST device 100, the DDST device 100 transfers or uploads the downloaded data from the DDST device to a server, STEP 406. According to an aspect of the present invention, the server typically is remote from the DDST device 100 and so such transfer is accomplished using wireless communications techniques. This transfer or uploading process is more particularly described below in connection with FIG. 5B.

After determining that such uploading was successfully completed, the DDST device 100 receives a signal or message causing the digitized data that was transferred to be erased from the DDST device storage medium 150, STEP 408. Alternatively, the user manually erases the digitized data at a time of their choosing. In addition, the server archives the transferred or uploaded digitized image data to a dedicated storage medium operably interconnected to server, Step 410. For example, the digitized image data is stored in a file location dedicated for a given user. Thereafter a user or other authorized individual can access the server stored digitized image data, STEP 412. It should be recognized that as discussed below in connection with FIGS. 5A,B additional information (e.g., Metadata) can be provided along with the digitized image data that can relate to the image data. For example, an insurance adjuster may include pertinent information regarding the insured and the claim being made along with the pictures taken by the adjuster relative to the claim.

As indicated above, the controller 110 includes software applications or programs for execution on the microprocessor 112 that provide overall control of any of the hereinabove described DDST devices 100a–100c. The instructions and criteria making up such software embody the method and techniques hereinafter described. Now referring to FIG. 5A, there is shown a high level flow diagram illustrating one embodiment for downloading the digitized image data to a DDST device according to the present invention. The following refers to a digital camera for purpose of describing the process of downloading data, however, it should be recognized that the present methodology is adaptable for use in downloading digitized image data from digital camcorders and other image/video capturing devices.

After acquiring the images in the digital camera 10, as provided in the instructions with the camera, and when a user wants to download the digitized image data for these acquired images to the DDST device 100, the user establishes a communications link between the camera 10 and the DDST device, STEP 500. As indicated above, establishing such a link is dependent upon the type of communications protocol or technique the digital camera 10 is intended to emulate. For example for USB, the interconnecting cable 30 is plugged into the USB I/O port 120a of the DDST device 110 thereby operably interconnecting the camera 10 and the DDST device. With USB, the communications protocol or manager includes a procedure for identifying newly connected devices. Thus, the USB communications protocol or manager can be used to automatically initiate a procedure to completely establish the communications link and initiate procedures or processes related to the data or information transfer. In another example, when wireless communications are established between the camera and the DDST device 100 using Bluetooth chips, the communications protocol(s) for such chips also can be used to initiate such procedures or processes related to the data or information transfer.

After the communications link has been established, the DDST device 100 starts the transmission process for transferring the digitized image data from the memory in the camera 10 to the DDST device and ultimately to the storage medium 150 of the DDST device, STEP 502. Specifically the controller 110 establishes an interface with the circuitry including the applications and programs of the camera 10 over the communications link, for example the interconnecting cable 30. In the case, where the camera 10 is being interconnected to the DDST device 100 via a network infrastructure, the DDST device also emulates the communication protocols that are appropriate for that network environment.

Before downloading data, a determination is made as to whether a user identification process is to be implemented, STEP 504. Such a process is undertaken in those cases, for example, where a verification or check is to be made to verify that the user is authorized to upload images to the server. This process also can be used as a mechanism for transmitting information that can be used to localize the image data in a predefined server storage location (i.e., predetermined data folder).

If it is determined that a user identification process is to be implemented (YES, STEP 504) then the DDST device prompts the user for the required information such as username and password, STEP 506. The user also could be prompted for other information such as, for example, the insurance claim number at the same time. This information can be inputted in any of a number of fashions as is known to those skilled in the art. For example, an input device (not shown) such as keyboard is interconnected to one of the I/O ports 120a,b/122a,b and this information is inputted and stored in the DDST device 100. When the DDST device is later interrogated, it automatically transmits the inputted identification information. Such identification information typically would be inputted along with the acquisition of the image data. In an alternative embodiment, the LCD display 140 is configured like the display of PDA's so that information can be inputted via the LCD screen.

The provided information, such as the username and password, is checked against a database STEP 508 to determine if the user is an authorized user, STEP 510. If the provided information does not check against the database, the user is not an authorized user (NO, STEP 510) and thus the process returns to again prompting the user for user identification information (STEP 506). It is not uncommon for an authorized user to mistype or miss-input required information in such situations. Also, such procedures typically include a protocol whereby any communications link is severed if correct information is not inputted after a given number of attempts.

If the provided information matches the information in the database and the user is thus considered an authorized user (YES, STEP 510) or if there was no user identification protocol in effect (NO, STEP 504), then the process proceeds with downloading the digitized image data to the DDST device 100. Such downloading includes instructing the digital camera 10 to download the entire contents of the camera's memory to the DDST device 100. More particularly, the DDST device controller 100 processes the digitized image data so that the downloaded data is retrievably stored in the storage medium 180. As part of the storage process, the controller may implement any of a number of archiving compression techniques known to those skilled in the art (e.g., GZIP).

The DDST device 100 also checks to make sure that the download is successfully accomplished. If not, then the camera is instructed again to download the image data. If the download is successful, then the DDST device outputs a signal, message or the like to the camera 10 so that the successfully downloaded image data is purged or erased from the camera's memory. In addition, the link between the camera 10 and the DDST device 100 is broken or terminated. As indicated above, this frees up the camera's memory as well as the camera so additional pictures or images can be acquired. The DDST device also continues, STEP 514, with whatever action that is ongoing or returns to awaiting to establish a communications link, STEP 500.

Figure 5B:
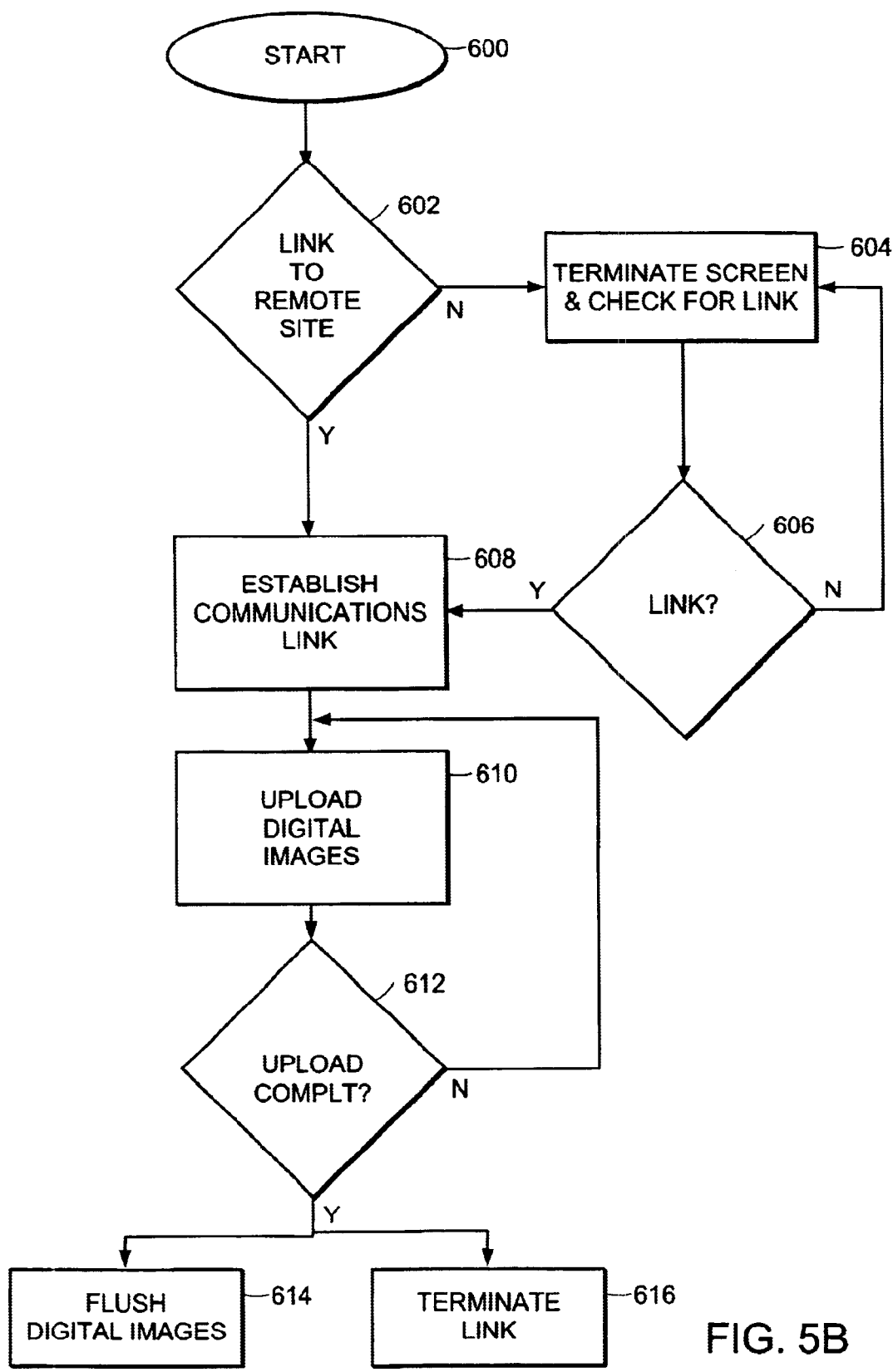
FIG. 5B is a flow diagram of one embodiment of the process for transmitting downloaded digitized image data from the digitized data storage and transmitting device.

Referring now to FIG. 5B there is shown a flow diagram of one embodiment of the process for transmitting downloaded digitized image data from the digitized data storage and transmitting device. Following the downloading of digitized image data to the DDST device 100, the DDST device initiates the transferring process, STEP 600. It should be recognized that it is within the scope of the present information for digitized image data to be stored and transmitted in parallel or in serial fashion. It also is within the scope of the present invention for the DDST device to be transmitting image data of a prior downloading while additional image data is being downloaded.

The transferring process begins by determining if there is a link between the DDST device 100 and the remote site, such as by determining or finding an internet orientated connection such as lan, wan or digital cellular telephone, STEP 602. If such a connection cannot be found (NO, STEP 602) then the process is terminated to the startup screen and the DDST device 100 begins a process of periodically checking to see or find a link, STEPS 604, 606. More particularly, the controller 110 is operated so that it repeatedly checks for such a link after a set period of time has elapsed (for example 1 minute), STEP 606. If a link is not found (NO, STEP 606) then this checking process continues.

If a link is found initially (YES, STEP 602) or if a link is found following one of the periodic checks (YES, STEP 606), then the controller proceeds to establish a communications link between the DDST device 100 and the remote server, STEP 608. As is known to those skilled in the art, the controller handshakes with the server and there is a key exchange so the server and DDST device know how the server will talk to the DDST device. In addition, and where applicable, the remote server 808 (FIG. 6A) can implement a user identification process similar to that described above in connection with FIG. 5A to determine if the user is an authorized user. As with the process described above, if the user is not an authorized user they will be re-prompted for user identification information. Also if they are unable to provide the necessary information, the link typically will be severed after a certain number of attempts.

Figure 6A:
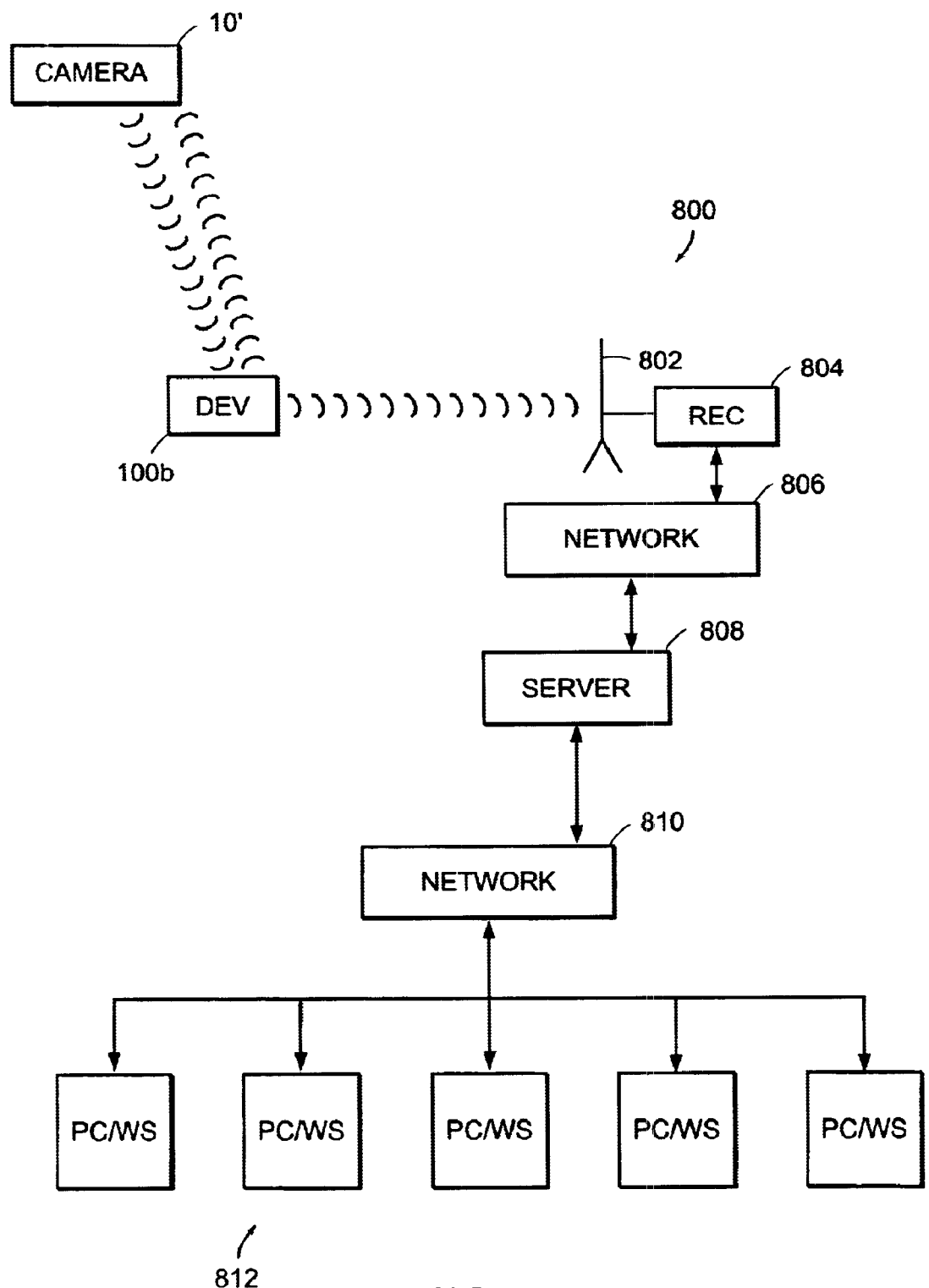
FIG. 6A is a schematic view of a system according to the present invention by which digitized data is transmitted from the digitized data storage and transmitting device to a remote site using wireless communications.

After the communications link is established, the image data is uploaded from the DDST device 100 to the remote server 808 (FIG. 6A). More particularly, the file transfer process is started over an encapsulated protocol, more specifically a custom protocol adapted to wireless, R-sync over SSH, FTP tunneled through SSH or HTTP or HTTPS over SSL. A determination is continuously made to see if the upload is complete, STEP 612. If it is not complete (NO, STEP 612) then the transfer or uploading of digital images is continued.

If the uploading process is completed (YES, STEP 612) then a signal, message or the like is sent back to the DDST device 100 indicating that transfer is complete. In response to the completion of the download, the controller 110 erases or purges the image data corresponding to that which has been successfully uploaded from the storage medium 150. In addition the controller 110 severs or terminates the communications link between the DDST device 100 and the remote server. In those case where communication is done over a wire or cable, the user also would unplug the cable.

Figure 5C:
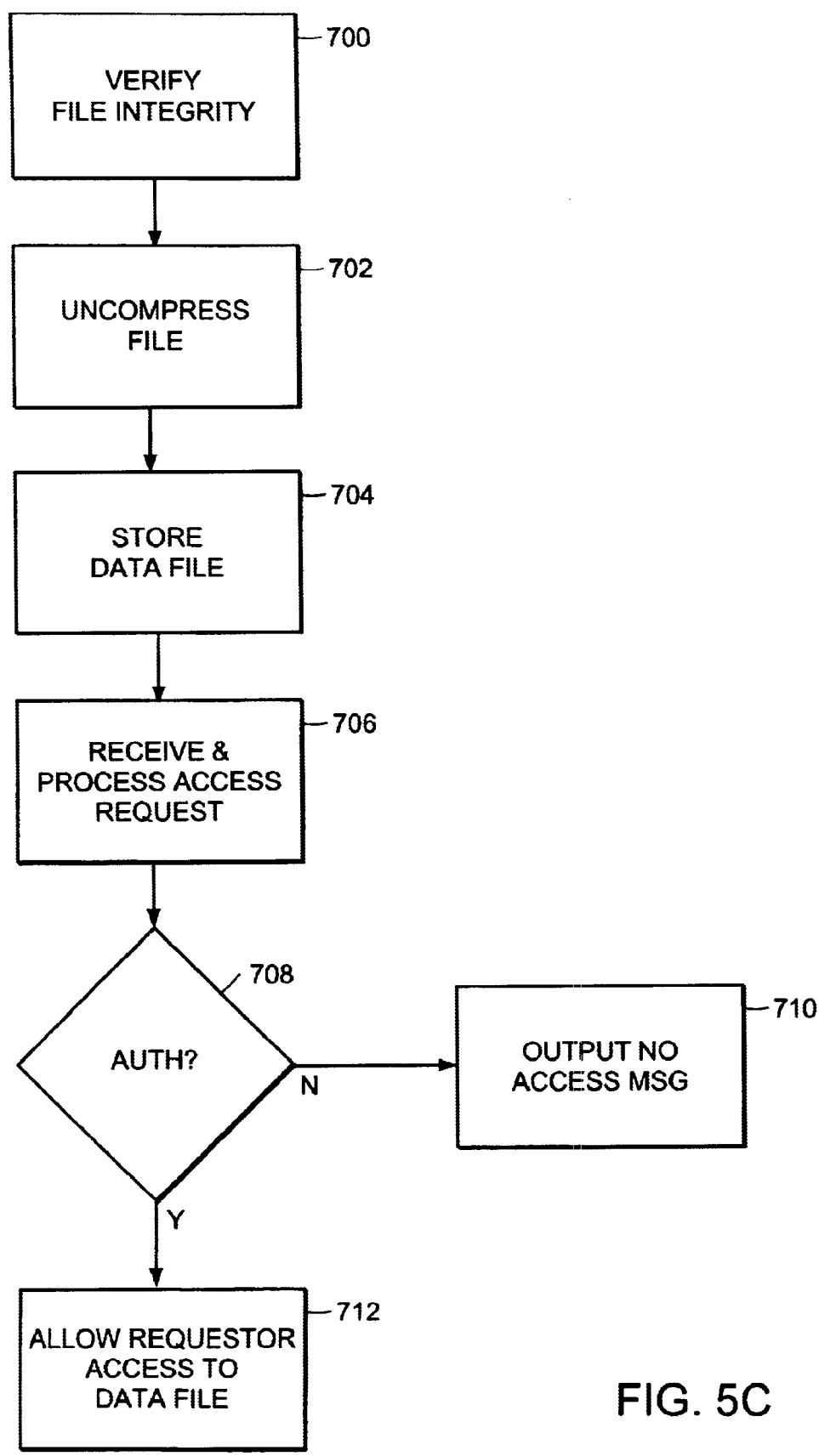
FIG. 5C is a flow diagram of one embodiment of a process for processing the uploaded image data at the server level and accessing such information from the server.

Now referring to FIG. 5C, there is shown a flow diagram of one embodiment of a process for processing the uploaded image data at the server level and for accessing such information from the server. When the server receives the data file including the digitized image data, the server verifies the integrity of the transferred file, STEP 700, using any of a number of techniques or methods known to those skilled in the art including hash. Because the uploaded data file is typically a compressed data file, the server also un-compresses the file, STEP 702 using the technique appropriate for that compressed data file.

After un-compressing the file, the server stores the data file in an appropriate manner or fashion on the hard drive being serviced by the server, STEP 704. Such storing includes for example, saving the file to a space designated for the user as well as transferring to a specified account. For example, a folder can be designated as the storage location for all image data files for a given user. In addition, such designated space can be further divided and configured so that files are further segregated into different folders, each folder having different accessing requirements.

When a user or a requester wants to access a data file stored on the storage medium being serviced by the server, the requestor/user submits or makes a request. This access request is processed to determine if the user/requestor is authorized to access the data file, STEPS 706, 708. If the requestor does not have authorization to access the data file (NO, STEP 708), an error/no access granted message is outputted, STEP 710. If the requestor has authorization to access the data file (YES, STEP 708), then the server grants access to the stored data. The access being granted can be limited to a read only type of access or access to manipulate or further process the data.

There is shown in FIGS. 6A-6D, a number of systems illustrating use of a DDST device 100 according to the present invention for different applications. Each of the below described systems include a digital camera 10 that is operably coupled to the DDST device 100 for illustration of a system in all of its aspects. It should be recognized that it is within the scope of the present invention, for the downloading of digitized image data to be completed and the camera disconnected from the DDST device 100 prior to the uploading of the digitized data from the DDST device to the server.

Now referring to FIG. 6A, there is shown a schematic view of a system 800 according to the present invention in which digitized image data acquired in a digital camera 10' is downloaded to a DDST device 100b using wireless communication techniques and transmitted from the DDST device to a remote site also using wireless communications. Reference should be made to the foregoing discussion regarding FIG. 3B for further details regarding the DDST device and the wireless communication with the camera 10'.

The system 800 includes a DDST device 100b, an antenna 802 located remote from the DDST device, and a transceiver 804 operably coupled to the antenna. As illustrated, the DDST device 100b sends the wireless (e.g., RF) transmissions to the system's antenna 802 and the signals received thereby are processed within the transceiver 804. The transceiver 804 and antenna 802 are any of a number of such devices known to those skilled in the art that are appropriate for the intended use.

The transceiver 804 is operably coupled to a network infrastructure 806 that in turn is operably coupled to the remotely located server 808. The network infrastructure 806 is any of a number of such networks as is known to those skilled in the art including Ethernet, token ring, FDDI, ATM, SONET, X.25 and BROADBAND. Such networks also can utilize wired or wireless technology to communicate amongst and between the transceiver and the server 808.

The server 808 is similarly operably coupled by another network infrastructure 810 to one or more personal computers or workstations 812. The personal computers/workstations 812 provide a mechanism by which a user or other authorized requestor can access the digitized data in the server 808, more specifically the storage medium being serviced by the server.

In a particular embodiment, the first network infrastructure 806 embodies wireless communications and the antenna 802 and transceiver 804 is any of a number of wireless hubs as is known to those skilled in the art. Further, the DDST device 100b is configured and arranged so that the DDST device in effect comprises a device of the network infrastructure 806.

In use, image data is acquired in the digital camera 10' and when desired by the user such acquired data is downloaded into the DDST device 100b. Thereafter the downloaded data is transmitted using wireless communications techniques to the transceiver 804 operably coupled to a first network infrastructure 806. This downloaded data is in turn communicated via the network infrastructure to a remotely located server 808.

Figure 6B:
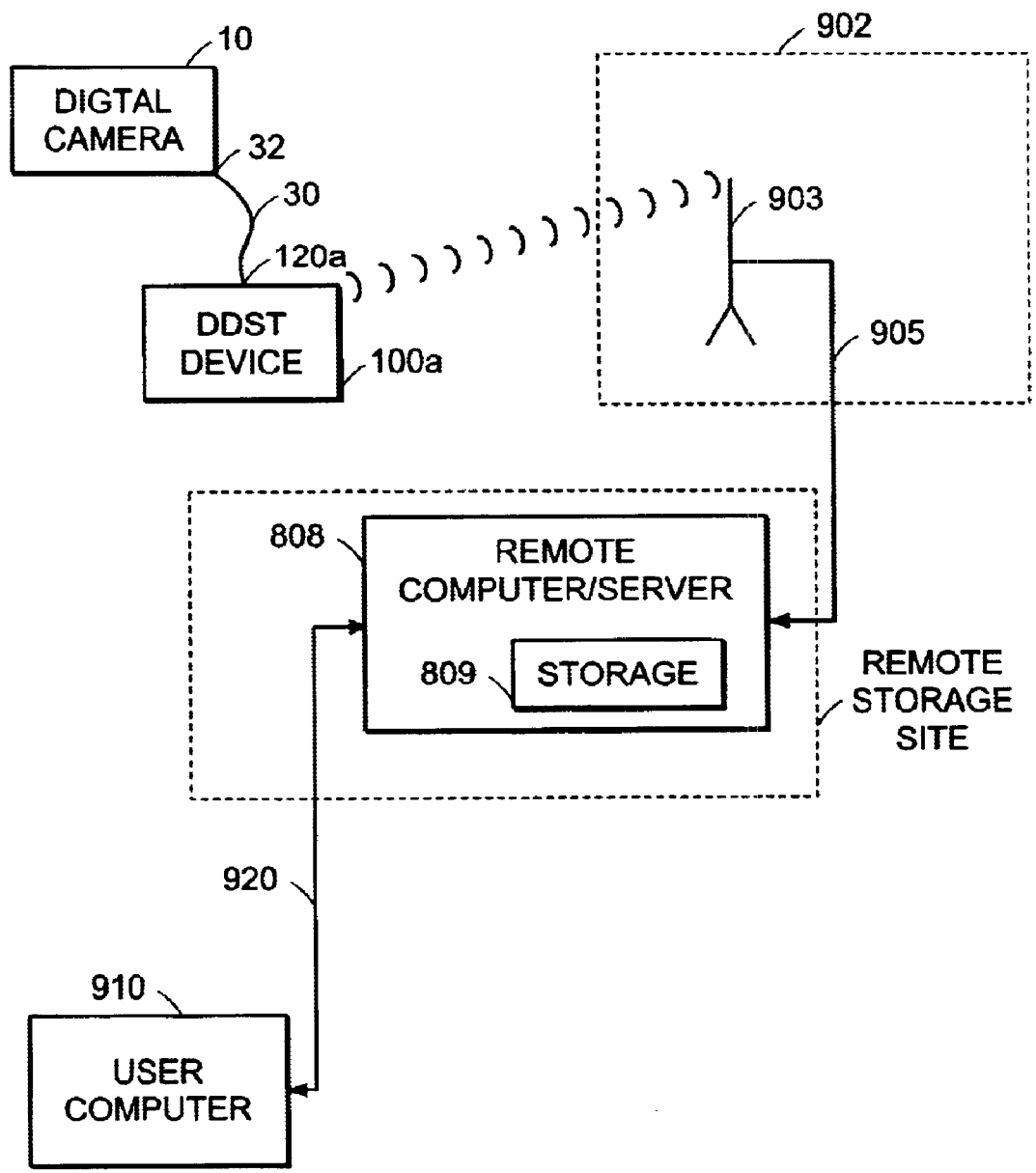
FIG. 6B is a schematic view of a system according to the present invention by which digitized data is transmitted from the digitized data storage and transmitting device to a remote site using cellular telephone communications.

Now referring to FIG. 6B there is a schematic view of a system 900 according to the present invention by which digitized data is transmitted from the DDST device 100a to a remote site using wireless cellular telephone communications. Reference should be made to the foregoing discussion regarding FIG. 3A for further details regarding the DDST device 100a and the communication link established between the camera 10 and the DDST device.

In the illustrated embodiment, the DDST device 100a communicates with the remote storage location (i.e., the remote server 808) using known cell phone communications systems 902. In effect the DDST device 100a calls the remote server 808 using the cell phone system 902 or is linked to the remote site via the internet. As illustrated, the device sends the wireless (RF) transmissions to the cell phone system's tower or antenna 903 and the received signals are transmitted using other well known communications system components or functionalities such as landlines 905 or RF towers, etc. to the remote server 808.

The signals from the cell phone system 902 are received at the remote server 808, processed and converted as needed so they can be stored in the storage medium 809 thereat. The storage medium 809 includes any of a number of computer readable storage medium including, but not limited to optical disks, magneto-optical disks, hard disk drive, and drives employing removable computer storage media. The remote storage location also includes mechanism(s) for causing the digitized data to be stored in the storage medium in a retrievable manner. In the illustrated example, the server and the executable software therein provides the mechanism for converting these signals and for storing the digitized data so that each of the digitized images can be later retrieved by the user or other authorized person. The server 808 also includes software to validate that transmissions are from authorized devices and that later transmissions of the stored image/picture data are to an authorized individual. In a specific embodiment, and as described above, the re-transmitted image data is transmitted to the authorized person's computer 910 via a network infrastructure 920 such as that provided by the internet.

Figure 6C:
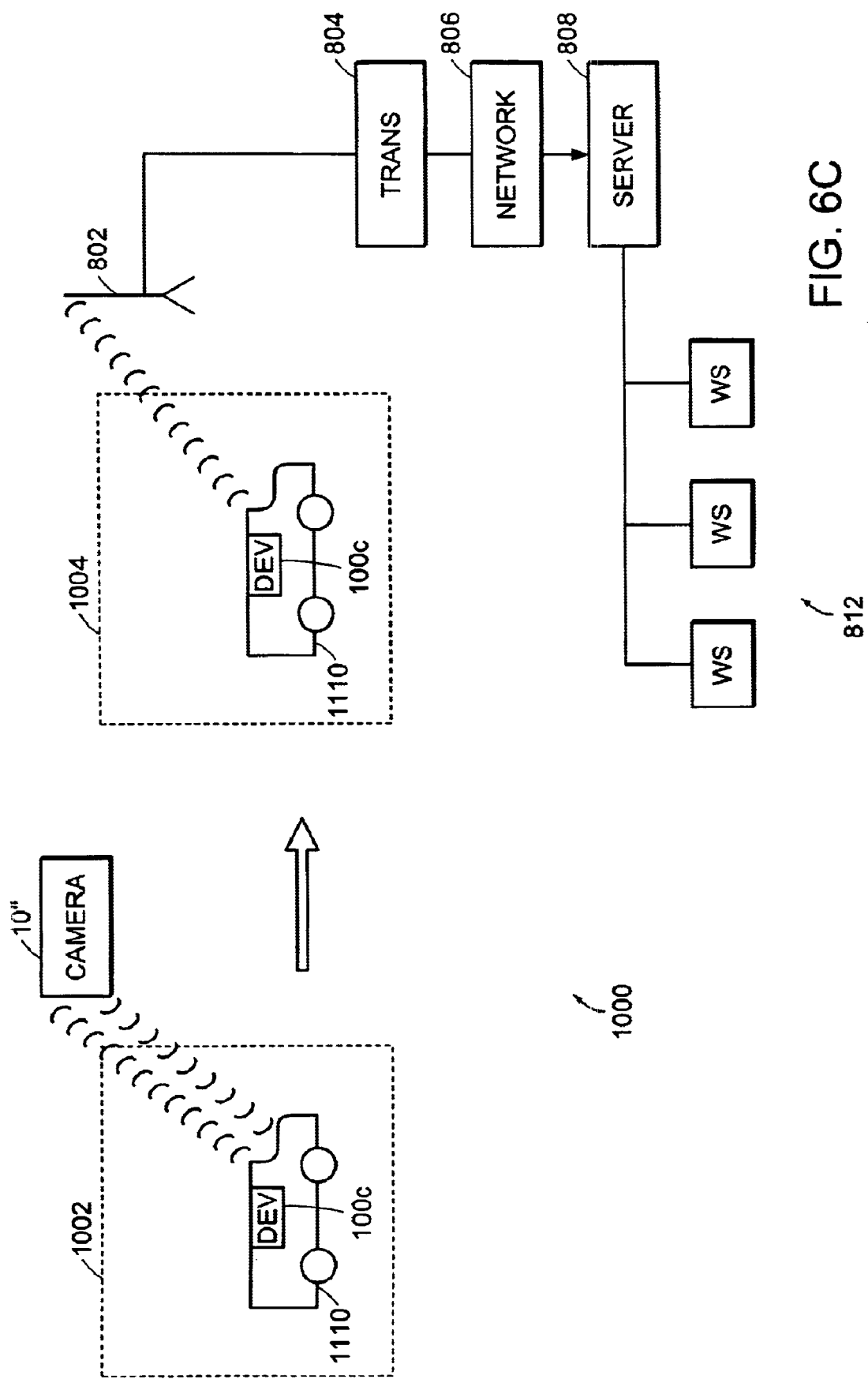
FIG. 6C is a schematic view of a system according to the present invention in which the camera is fixed and the digitized data storage and transmitting device moves between an area where pictures are taken and a site where digitized data is to be transmitted.

As indicated above, there are cases where the camera 10" is in a fixed location and the DDST device 100c is moveable. Referring now to FIG. 6C there is shown a schematic view of a system 1000 according to the present invention in which the camera 10" is fixed and the DDST device 100c can be moved between an area where pictures are taken and a site or location where digitized data is to be transmitted. Reference shall be made to FIG. 3C and FIGS. 6A–6B for details of common elements and features.

In the illustrated embodiment, the DDST device 100c is mounted on a vehicle 1010 that is moveable between any of a number of positions, one position being the area 1002 where the camera 10" is viewing and another area 1004 whereat data transmission should occur. In use, when the DDST device 100c comes into the viewing area of the camera 10" the transmitter 190 sends out a signal triggering the camera so that it begins to acquire images/image data. More particularly, image data including the moving vehicle 1010. After a predetermined time has elapsed or a prespecified number of pictures are taken, comprising an image acquisition cycle, the camera 10" wirelessly communicates with the DDST device 100c so as to download the acquired image data to the DDST device.

When the vehicle 1010 enters the data transmission area 1004, the DDST device 100c transmits the downloaded digital image data to the transceiver 804. As described above in FIG. 6A, this data is in turn communicated to the remote server 808 so that this information is accessible to one or more personal computers/workstation 812 via a network.

Figure 6D:
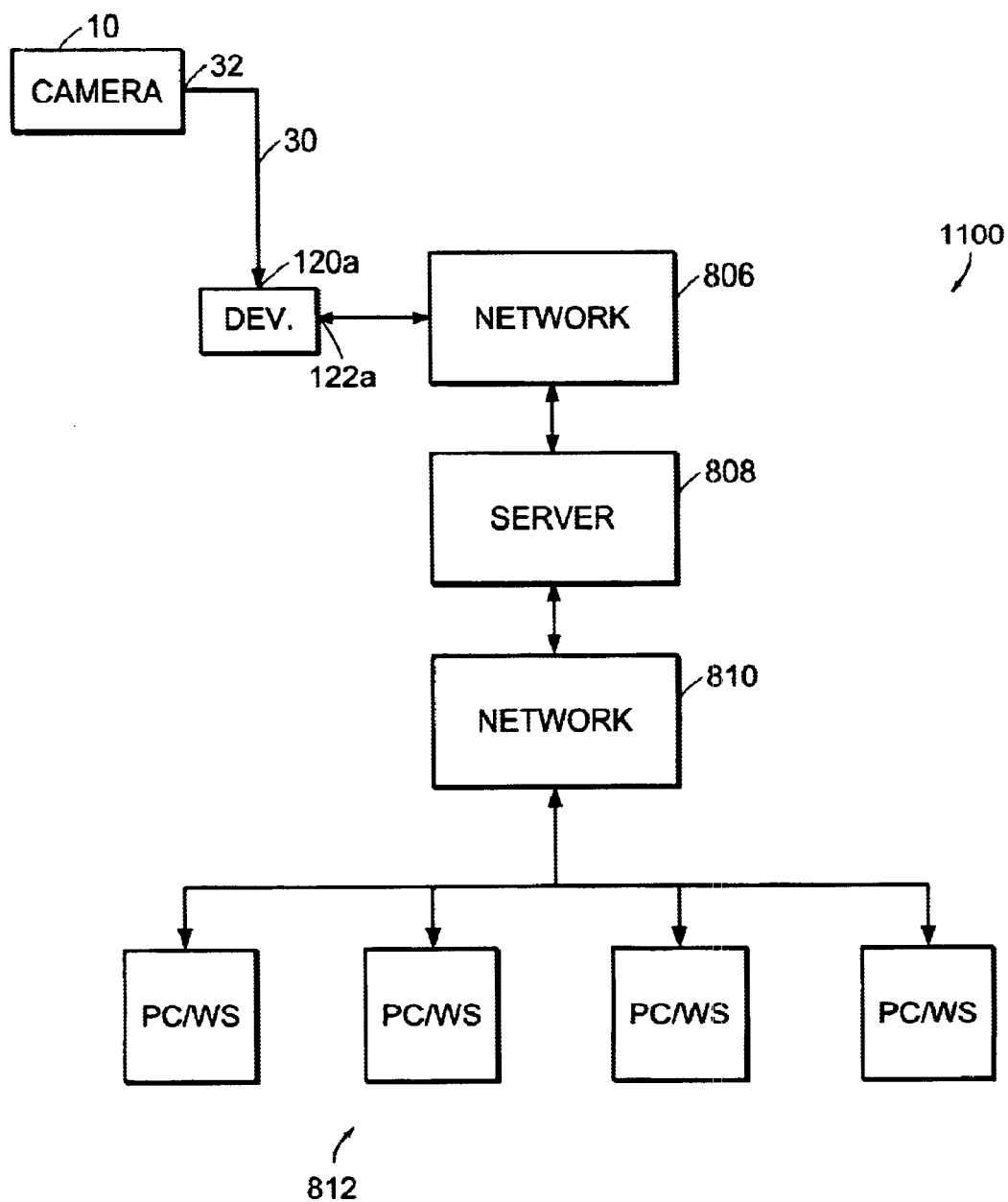
FIG. 6D is a schematic view of a system according to the present invention by which digitized data is transmitted from the digitized data storage and transmitting device to a remote site/server using an internet communications network.

Now referring to FIG. 6D there is shown a schematic view of a system 1100 according to the present invention by which digitized data is transmitted from the DDST device 100a to a remote site/server using an internet communications network. Reference shall be made to FIG. 3A and FIGS. 6A–6C for details of common elements and features.

In the illustrated embodiment, the DDST device 100a, more specifically one of the output ports 122a, is interconnected to a first network infrastructure 806 by means of a cable such as category 5 cable as is known to those skilled in the art. In this way, the digitized image data is uploaded to the remote server 808 over the first network infrastructure from the DDST device.

Although a preferred embodiment of the invention has been described using specific terms, such description is for illustrative purposes only, and it is to be understood that changes and variations may be made without departing from the spirit or scope of the following claims.

What is claimed is:

1. A digital data storage and transmitting device comprising:
    a controller configured and arranged so as to control the operation of the digital data storage and transmitting device and functionalities thereof;
    a storage medium;
    an I/O mechanism configured and arranged so as to operably connect the storage medium and a data output of an image capturing device;
    a first transmitting apparatus operably connected to the storage medium;
    wherein the controller controls the downloading of digitized image data from the image capturing device via the I/O mechanism and storage of said data in the device storage medium, and controls the transmission of the stored downloaded data from the device storage medium via the transmitting apparatus to another storage medium serviced by a server remote from the digital data storage and transmitting device;
    wherein the image capturing device is fixed and includes a third transmitting apparatus that embodies wireless communication protocols and techniques, where the image capturing device transmits acquired digitized image data via the third transmitting apparatus after completion of an image acquisition cycle;
    wherein the digital data storage and transmitting device including a fourth transmitting apparatus and is moveable so as to pass through the viewing area of the image capturing device; and
    wherein the controller includes a microprocessor and an applications program for execution on the microprocessor, the applications program including instructions and criteria for:
        downloading digitized image data from the image capturing device via the I/O mechanism,
        outputting a signal from the fourth transmitting apparatus when in a viewing area of the image capturing device so as to cause the image capturing device to begin to acquire image data,
        receiving the digitized image data being wirelessly transmitted from the image capturing device,
        processing the downloaded, received digitized data so that it is stored in the device storage medium, and
        transmitting the stored data from the device storage medium to the another storage medium.

2. The digital data storage and transmitting device of claim 1, wherein the device storage medium comprises a non-volatile type of storage medium.

3. The digital data storage and transmitting device of claim 2, wherein the non-volatile type of storage medium comprises one of flash memory, spindle memory, a non-volatile type of random access memory or a hard drive.

4. The digital data storage and transmitting device of claim 1, wherein the first transmitting apparatus embodies wireless communication protocols and techniques.

5. The digital data storage and transmitting device of claim 1, wherein the applications program further includes instructions and criteria for:
    establishing a communications link between the image capturing device and the microprocessor before the downloading of data; and
    establishing a communications link between the microprocessor and the remote server.

6. The digital data storage and transmitting device of claim 5, wherein the applications program further includes instructions and criteria for:
    converting the digitized data to be transmitted into the appropriate format for transmission; and
    encrypting the transmission.

7. The digital data storage and transmitting device of claim 1, wherein the I/O mechanism comprises a port configured and arranged so as to be compatible with a particular communications protocol and technique used to communicate the digitized data from the image capturing device and the device storage medium.

8. The digital data storage and transmitting device of claim 1, wherein the I/O mechanism includes a second transmitting apparatus mechanism that embodies wireless communication protocols and techniques.

9. An image capturing and storage system comprising:
    an image capturing device that includes a third transmitting apparatus that embodies wireless communication protocols and techniques;

a digital data storage and transmitting device that is moveable so as to pass through a viewing area of the image capturing device;

a server including a storage medium;

a first communications link removable interconnecting the image capturing device and the digital storage and transmitting device, where the first communication link includes the third transmitting apparatus of the image capturing device;

a second communications link interconnecting the digital data storage and transmitting device and the server; and wherein the digital data storage and transmitting device comprises:

a controller configured and arranged so as to control the operation of the digital data storage and transmitting device and functionalities thereof, a storage medium;

an I/O mechanism configured and arranged so as to operably connect the storage medium to the first communications link;

a first transmitting apparatus operably connected to the storage medium; and a fourth transmitting apparatus;

wherein the controller controls the downloading of digitized image data from the image capturing device via the I/O mechanism and storage of said data in the device storage medium, and controls the transmission of the stored downloaded data from the device storage medium via the first transmitting apparatus to the server storage medium; and wherein the controller includes a microprocessor and an application program for execution on the microprocessor, the applications program including instructions and criteria for:

outputting a signal from the fourth transmitting apparatus when in a viewing area of the image capturing device so as to cause the image capturing device to begin to acquire image data, downloading and receiving digitized image data from the image capturing device via the first communications link and the I/O mechanism, processing the downloaded, received digitized data so that it is stored in the device storage medium, and transmitting the stored data from the device storage medium to the server over the second communication link.

10. The image capturing and storage of claim 9, wherein the device storage medium comprises a non-volatile type of storage medium, the non-volatile type of storage medium comprising one of flash memory, spindle memory, a non-volatile type of random access memory or a hard drive.

11. The image capturing and storage system of claim 9, wherein the device I/O mechanism embodies wireless communication protocols and techniques.

12. The image capturing and storage system of claim 9, wherein a portion of the second communications link and the device transmitting mechanism embodies wireless communication protocols and techniques.

13. The image capturing and storage system of claim 9, wherein another portion of the second communications link comprises a network infrastructure embodying of at least wired or wireless protocol technique.

14. A method for capturing images using an image capturing device and storing the captured images at a remote storage location, the image capturing device including a third transmitting mechanism that embodies wireless communication protocols and techniques, where the image capturing device transmits acquired image data via the third transmitting device, said method comprising the steps of:

providing a digital data storage and transmitting device including:

a controller configured and arranged so as to control the operation of the digital data storage and transmitting device and functionalities thereof, a storage medium, an I/O mechanism configured and arranged so as to operably connect the storage medium to the image capturing device, a first transmitting apparatus operably connected to the storage medium, a fourth transmitting apparatus;

(b) outputting a signal from the fourth transmitting apparatus when digital data storage and transmitting device is in a viewing area of the image capturing device so as to cause the image capturing device to begin to acquire image data, (c) downloading digitized image data from the image capturing device via the I/O mechanism;

(d) receiving the digitized image data being wirelessly transmitted from the image capturing device;

(e) processing the downloaded, received digitized data and storing said downloaded data in the device storage medium; and transmitting the stored downloaded data from the device storage medium via the first transmitting apparatus to a storage medium at the remote storage location.

15. The method of claim 14 further comprising the steps of:

providing a server at the remote storage location that is operably coupled to the remote location storage;

establishing a first communications link removable interconnecting the image capturing device and the digital storage and transmitting device; and establishing a second communications link interconnecting the digital data storage and transmitting device and the server.

16. The method of claim 14, wherein a portion of the second communications link embodies wireless communication protocols and techniques.

17. The method of claim 16, wherein another portion of the second communications link comprises a network infrastructure embodying of at least one of a wired or wireless protocol/technique.

* * * * *